United States Patent [19]

Katsumata et al.

[11] 4,411,140
[45] Oct. 25, 1983

[54] ABSORPTION TYPE COOLING AND HEATING SYSTEM

[75] Inventors: Naoto Katsumata; Noriaki Horiuchi; Shigeru Kimura, all of Shimizu, Japan

[73] Assignee: Hitachi, Ltd., Tokyo, Japan

[21] Appl. No.: 344,803

[22] Filed: Feb. 1, 1982

[30] Foreign Application Priority Data

Feb. 9, 1981 [JP] Japan ................................. 56-17001

[51] Int. Cl.³ .............................................. F25B 13/00
[52] U.S. Cl. ..................................... 62/324.2; 62/476
[58] Field of Search ............................. 62/324.2, 476

[56] References Cited

U.S. PATENT DOCUMENTS

| | | | |
|---|---|---|---|
| 3,527,061 | 9/1970 | Kruggel | 62/142 |
| 3,638,452 | 2/1972 | Kruggel | 62/485 |
| 4,207,751 | 6/1980 | Kampfonkel | 62/141 |
| 4,368,624 | 1/1983 | Takeshita | 62/324.2 |

Primary Examiner—Lloyd L. King
Attorney, Agent, or Firm—Antonelli, Terry & Wands

[57] ABSTRACT

An absorption type cooling and heating system including a generator, an outdoor heat exchanger, pressure reducing devices, two indoor heat exchangers, an absorber, a solution pump, change-over valves, on-off valves and check valves, wherein in a cooling mode the outdoor heat exchanger functions as a condenser and the two indoor heat exchangers function as evaporators and in a heating mode one of the two outdoor heat exchangers functions as a condenser, the other outdoor heat exchanger functions as an absorber and the outdoor heat exchanger and the absorber function as evaporators, so that the heat of a refrigerant in a gaseous state of high temperature and the heat of absorption generated at the absorber can both be utilized as heating heat sources. In a defrosting mode, the outdoor heat exchanger and the absorber function as condensers and one of the two indoor heat exchangers functions as an absorber, so that space heating can be carried out even during the defrosting mode.

6 Claims, 5 Drawing Figures

ABSORPTION TYPE COOLING AND HEATING SYSTEM

BACKGROUND OF THE INVENTION

This invention relates to a cooling and heating system using a refrigerating apparatus of the absorption type.

Absorption type refrigerating apparatus use thermal energy as an energy source. In recent years, a cooling and heating system of the gas burning absorption type has come to attract attention, in view of the fact that a demand for electric power in the summertime has reached a peak load level due to popularization of electric cooling systems, and with a view to switching the energy source from oil to natural gas.

There are available a variety of combinations of a refrigerant and an absorbing agent used with absorption type refrigerating apparatus. The combinations that have been put to practical use include water and lithium bromide, ammonia and ammonia water, and Fron (CHClF$_2$) and tetraethyleneglycol dimethylether (CH$_3$O(CH$_2$CH$_2$O)$_4$CH$_3$), for example.

A gas burning absorption type cooling and heating system of the prior art referred to hereinabove includes in the refrigeration cycle a generator, a condenser, pressure reducing means, an evaporator, an absorber and a liquid pump as basic components. A heat source of a refrigerant of high temperature heated and separated at the generator serves as a heating heat source, and a latent heat source generated at the evaporator serves as a cooling heat source. This type of cooling and heating systems are disclosed in U.S. Pat. Nos. 3,527,061 and 3,638,452 to Roy W. Kruggel et al, U.S. Pat. No. 4,207,751 to Ottomar Kampfenkel et al. and Japanese Patent Application Laid-Open No. 53052/78 (Shozo Saito), for example. U.S. Pat. No. 3,527,061 contemplates performing a cooling and heating operation by switching the system between cold water and heated water circuits without effecting change-over of the refrigerant circuit. The refrigerant of elevated temperature separated at the generator is condensed into a liquid state at the condenser and fed to the evaporator after passing through the temperature type automatic expansion valve for pressure reduction and expansion, so as to cool the water flowing through the evaporator. In a cooling mode, the cooled water is supplied through a water channel change-over valve to a heat exchanger mounted in a spaced to be cooled, where heat exchange takes place between the water and air forcedly fed to the heat exchanger by a blower to cool the air. In a heating mode, the hot water flowing through the condenser is supplied through the water channel change-over valve to the heat exchanger mounted in the space to be heated, to effect heating of the space by heating air with the hot water. During the heating mode, frost formation takes place in an outdoor heat exchanger, when the operation is performed over a prolonged period. Defrosting can be carried out, however, by temporarily switching the water channel to a cooling operation.

In U.S. Pat. No. 3,638,452, no switching of the refrigerant circuit and the water circuit is effected and cooling and heating operations are performed by using cold water and hot water respectively. The refrigerant of elevated temperature separated at the generator is changed into a liquid stated by condensation at the condenser and supplied to the evaporator after having its pressure reduced by expansion, to cool the water flowing through the evaporator for use as a cooling heat source. For a heating heat source, the absorber, condenser and generator are formed into a water circuit for producing hot water.

In U.S. Pat. No. 4,207,751, no change-over of the refrigerant circuit is effected and a refrigerant is directly supplied, in a cooling mode, to a heat exchanger mounted in a duct leading to a space to be cooled, to directly cool the air. In a heating mode, the heat generated at the condenser and absorber is recovered through a hot water circuit, so as to provide a heating heat source.

Japanese Patent Application Laid-Open No. 53052/78 relies on the change-over of the refrigerant circuit for producing cold water and hot water for performing cooling and heating operations. In a cooling mode, the water cooled at the evaporator is used as a cooling heat source, and in a heating mode the evaporator is made to function as an absorber and an absorber is made to function as an evaporator, by switching the refrigerant circuit in some parts thereof.

Thus the cooling and heating systems using absorption type refrigerating apparatus of the prior art can be broadly classified into three types: one type produces cold water and hot water to provide heat sources for cooling and heating operations without effecting change-over of the refrigerant circuit; another type performs a cooling operation in a direct expansion system by causing heat exchange to take place between air and a refrigerant through a heat exchanger, and a heating operation by producing hot water by utilizing heat of absorption and heat of condensation, to use the hot water as a heating heat source; and still another type relies on the change-over of the refrigerant circuit to produce cold water and hot water, to make them serve as cooling and heating heat sources.

Generally, when a heat exchanger of the air cooling type is used, it is necessary to carry out defrosting in a heating mode because of frost formation. When defrosting is carried out, the system may be temporarily switched from the heating operation to a cooling operation as described in U.S. Pat. No. 3,527,061 referred to hereinabove. However, this process suffers the disadvantage that cold water is supplied to the indoor heat exchanger during a defrosting operation and the air in a space to be heated is temporarily cooled, so that the cold air ejected into the space makes people unpleasant and uncomfortable. To minimize the cold air blown into the space to keep the people from becoming uncomfortable, the number of revolutions of the blower may be decreased, the blower may be rendered totally inoperative or an auxiliary heat source, such as an electric heater, may be utilized to heat the ejected cold air, in a cooling and heating system of the air cooling heat pump type which uses a compressor. In some other cooling and heating systems of the compression type, a heating operation may be performed by using a plurality of heat exchangers while performing defrosting through one of the heat exchangers. This type has the disadvantage that it has a large size and the system becomes large in capacity, and the principle of operation cannot be incorporated in a system of small capacity.

Meanwhile heating and cooling systems of the water heat source and water cooling type would not satisfy the social needs because the water resources are running scarce and strict limitations are placed on their use.

In view of the foregoing, it is necessary that even an absorption type cooling and heating system be constructed as a heat pump type system of the air heat source and air cooling type, to meet the requirement of energy conservation.

SUMMARY OF THE INVENTION

An object of this invention is to provide a heat pump type cooling and heating system which is high in performance and capable of contributing to energy conservation.

Another object is to provide a heat pump type cooling and heating system with an air heat source capable of performing defrosting of an outdoor heat exchanger while performing a heating operation in a heating mode.

Still another object is to provide a heat pump type cooling and heating system with an air heat source suitable for using a Fron base or ammonia base refrigerant of high pressure.

To accomplish the aforesaid objects, there is provided an absorption type cooling and heating system comprising an outdoor heat exchanger and two indoor heat exchangers, wherein in a cooling mode, the path of a refrigerant is switched by means of a change-over valve to enable the outdoor heat exchanger to act as a condenser while allowing the two indoor heat exchangers to function as evaporators by switching the path of the refrigerant by means of another change-over valve; in a heating mode, the path of the refrigerant is switched by means of the two change-over valves to enable one of the indoor heat exchangers and the other indoor heat exchanger to act as a condenser and an absorber respectively while allowing the outdoor heat exchanger and the absorber to function as evaporators; and in a defrosting mode, the path of the refrigerant is switched by means of the change-over valves to enable the outdoor heat exchanger and the absorber to act as condensers while allowing one of the indoor heat exchangers to function as an absorber.

The outstanding characteristics of the invention are that in a system comprising a basic circuit including a generator, an absorber, an outdoor heat exchanger and two indoor heat exchangers, a path on the refrigerant side and a path on the solution side are switched by means of change-over valves to enable the outdoor heat exchanger to function as a condenser in a cooling mode, as an evaporator in a heating mode and as a condenser in a defrosting mode; the two indoor heat exchangers are allowed to function as evaporators in a cooling mode and as a condenser and an absorber in a heating mode while one of them is allowed to function as an absorber and the other indoor exchanger is rendered inoperative in a defrosting mode; and the absorber is allowed to function as an absorber in a cooling mode, as an evaporator in a heating mode and as a condenser in a defrosting mode.

One of the novel features of the invention is that the system can perform defrosting without losing the overall heating capabilities. More specifically, one of the two indoor heat exchangers is allowed to function as a condenser and the outdoor heat exchanger and the absorber are both allowed to function as evaporators in a heating mode. However, frost formation may occur as the heating mode continues. To effect defrosting, the path of the refrigerant is switched by means of the change-over valve to allow the refrigerant of high temperature to flow to the evaporator. After melting the frost on the surface of the evaporator, the refrigerant flowing out of the evaporator is joined to a diluted solution (a solution containing no refrigerant) separated from the refrigerant at the generator, to flow into one of the two indoor heat exchangers to perform absorption. The heat dissipated as the result of the absorption is ejected into the space to be heated by an indoor blower to serve as a heating heat source. The refrigerant is absorbed into the solution to provide a concentrated solution (a solution containing the refrigerant) which is returned to the generator by means of a solution pump in one cycle. While defrosting is being carried out, no refrigerant flows through the other indoor heat exchanger. However, the heat generated in the heating mode remains in the system and can be advantageously utilized as a heating heat source.

Another novel feature of the invention is that the system provided by the invention is a heat pump and absorption type cooling and heating system with an air heat source which is suitable for using a refrigerant of high pressure.

Still another feature is that defrosting of two evaporators can be simultaneously carried out in a defrosting mode.

Still another feature is that in a heating mode, a refrigerant of high temperature is allowed to pass through one of the two indoor heat exchangers and a solution of high temperature are allowed to flow through the other indoor heat exchanger while performing absorption, so that the heat of the refrigerant of high temperature and the heat of absorption can both be utilized as heating heat sources.

A further feature is that in a heating mode, the outdoor heat exchanger and the absorber are both made to function as evaporators to increase the heat transfer area of the evaporator, to thereby increase evaporating capabilities. This is conductive to the improved coefficient of performance, and enables water to be used readily as a heat exchange fluid besides air.

the invention offers the aforesaid many advantages. Thus the system provided by the invention can function as a heat pump and absorption type cooling and heating system with an air heat source which is high in performance and capable of contributing to energy conservation.

DETAILED DESCRIPTION OF THE PREFERRED EMBODIMENTS

Figure 1:
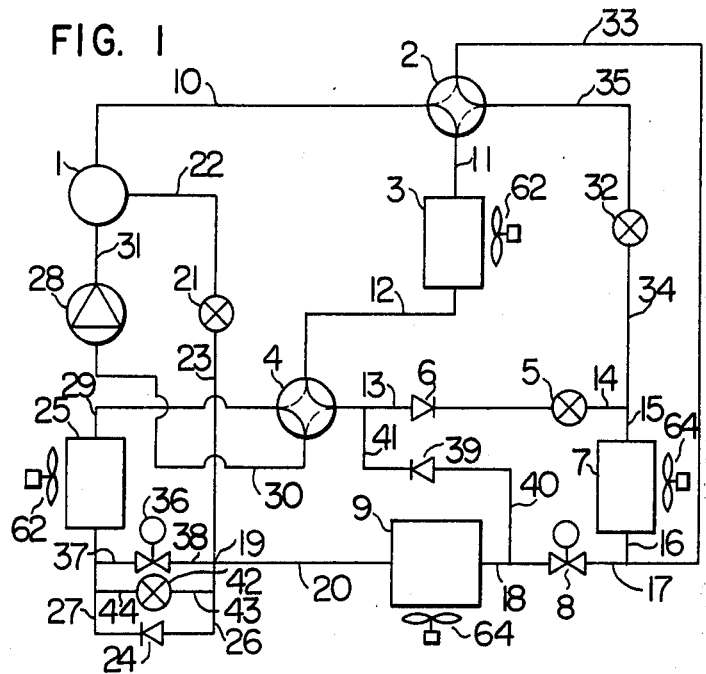
FIG. 1 is a systematic view of the refrigeration cycle of the absorption type cooling and heating system comprising one embodiment of the invention.

FIG. 1 shows a refrigeration cycle in a systematic view in which a refrigerant flows through two indoor heat exchangers in a series in a cooling mode. More specifically, a refrigerant gas section of a generator 1 is connected in series with a first indoor heat exchanger 7, a second valve 8 which is an on-off valve, and a second indoor heat exchanger 9 through a first change-over valve 2 which is a four-way valve, an outdoor heat exchanger 3, a second change-over valve 4 which is a four-way valve, a first valve 6 which is a check valve, and a first expansion valve 5 which is pressure reducing means, via lines 10, 11, 12, 13, 14, 15, 16, 17 and 18, so that the first and second indoor heat exchangers 7 and 9 are connected in series with each other and the exchanger 9 is connected via a line 20 to point of confluence 19 with a diluted solution.

A solution section of the generator 1 is connected through a pressure reducing valve 21 to the point of confluence 19 via lines 22 and 23. The point of confluence 19 is connected to an absorber 25 through a third valve 24 which is a check valve via lines 26 and 27. The absorber 25 is connected to the second change-over valve which is a four-way valve to the generator 1 through a solution pump 28 via lines 29, 30 and 31. The first change-over valve 2 which is a four-way valve is connected through the first indoor heat exchanger 7 to a second expansion valve 32 which is pressure reducing means via lines 33, 16, 15 and 34. The second expansion valve is connected to the outdoor heat exchanger 3 through the first change-over valve 2 which is a four-way valve via lines 35 and 11. The outer heat exchanger 3 is connected through the second chage-over valve 4 which is a four-way valve, the absorber 25 and a fifth valve 36 which is an on-off valve to the point of confluence 19 via lines 12, 19, 27, 37 and 38. The point of confluence 19 is connected is connected to the second change-over valve 4 which is a four-way valve through the second indoor heat exchanger 9, and an eight valve 39 which is a check valve via lines 20, 18, 40 and 41. A third expansion valve 42 which is pressure reducing means is connected in parallel with the third valve 24 which is a check valve and the fifth valve 36 which is an on-off valve via lines 43 and 44.

Figure 2:
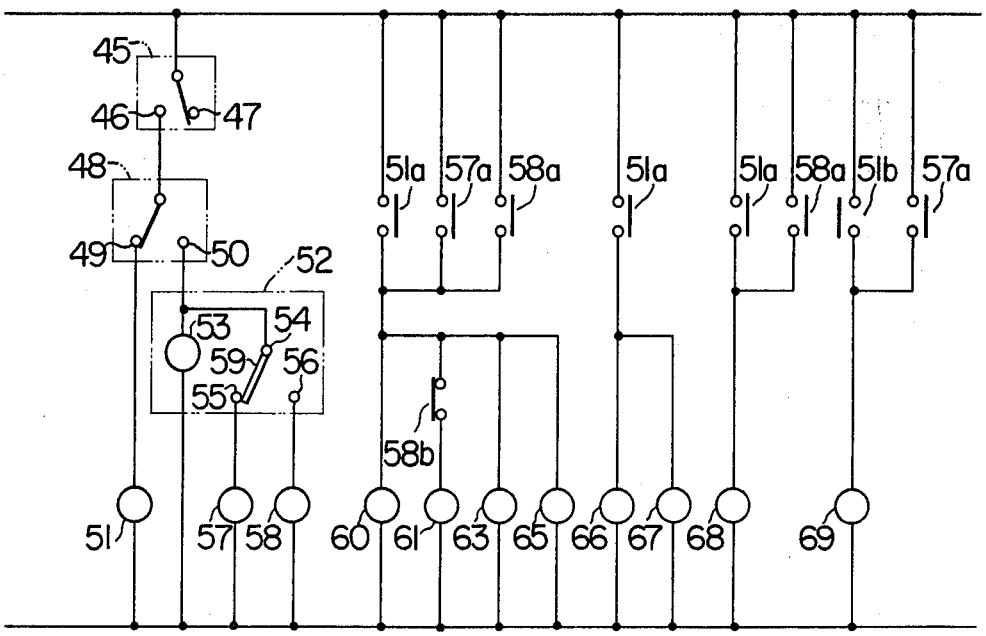
FIG. 2 is a circuit diagram showing an operation circuit of the system shown in FIG. 1.

FIG. 2 shows one example of the operation circuit for the absorption type cooling and heating system of the construction shown in FIG. 1. 45 is an operation switch having an operation contact 46 and a shutdown contact 47, the former being connected to an operation mode change-over switch 48. 49 is a cooling operation contact, and 50 a heating operation contact. The cooling operation contact 49 is connected to an auxiliary relay 51, and the heating operation contact 50 is connected to a timer 53 and a thermostat contact 54 of a defrosting operation switch 52. A contact 55 is a heating contact and a contact 56 is a defrosting contact. The contact 55 is connected to an auxiliary relay 57 and the contact 56 is connected to an auxiliary relay 58. The number of defrosting operations and the defrosting time are set by means of the timer 53 and thermostat 59.

60 is an electromagnetic contact of the solution pump 28 connected in series with positive contacts 51a, 57a and 58a of the auxiliary relays 51, 57 and 58 respectively. 61 is an electromagnetic contact of a blower 62 for the outdoor heat exchanger connected in parallel with the electromagnetic contact 60 of the solution pump 28 through a reverse contact 58b of the auxiliary relay 58. 63 is an electromagnetic contact of a blower 64 for the indoor heat exchangers connected in parallel with the blower circuit for the outdoor heat exchanger. 65 is an auxiliary realy. 66 is an electromagnetic coil of the second change-over valve 4 which is a four-way valve connected in series with another positive contact 51a of the auxiliary relay 51. 67 is an electromagnetic coil of the second valve 8 which is an on-off valve connected in parallel with the electromagnetic coil 66 of the second change-over valve 4 which is a four-way valve. 68 is an electromagnetic coil of the first change-over valve 2 which is a four-way valve connected in series with other positive contacts 51a and 58a of the auxiliary relays 51 and 58. 69 is an electromagnetic coil of the fifth valve 36 which is an on-off valve connected in series with a reverse contact 51b of the auxiliary relay 51 and another positive contact 57a of the auxiliary relay 57.

Operation of the embodiment of the absorption type cooling and heating system in conformity with the invention as shown in FIGS. 1 and 2 will now be described.

In performing a cooling operation, the operation switch 45 is changed over to the operation contact 46 and an operation mode change-over switch 48 is set at the cooling operation contact 49. This energizes the auxiliary relay 51, and the electromagnetic contact 61 of the blower 62 for the outdoor heat exchanger and the electromagnetic contact 63 of the blower 64 for the indoor heat exchangers are energized through the electromagnetic contact 60 of the solution pump 28 connected to the positive contact 51a of the auxiliary relay 51 and the reverse contact 58b of the auxiliary relay 58 which is not energized, so that the solution pump 28, blower 62 for the outdoor heat exchanger and the blower 64 for the indoor heat exchangers start operation. The auxiliary relay 65 is a circuit for controlling the heating source of the generator 1 and fired in conjunction with a combustion gas control circuit, for example. Energization of the auxiliary relay 51 also energizes the electromagnetic coil 68 of the first change-over valve 2 which is a four-way valve and the electromagnetic coil 66 of the second change-over valve 4 which is a four-way valve through another positive contact 51a of the auxiliary relay 51, so that the first and second change-over valves 2 and 4 are switched and have their passages oriented in directions indicated in solid lines in FIG. 1. The electromagnetic coil 67 is energized as soon as the second change-over valve 4 is switched, so that the second valve 8 which is an on-off valve is opened. Meanwhile the fifth valve 36 which is also an on-off valve is closed because no current is passed to the electromagnetic coil 69.

The generator 1 has a mixture of a refrigerant, such as Fron 22 ($CHCLF_3$), and an absorbing agent, such as tetraethyleneglycol dimethylether, contained therein and heated as by combustion gas. Besides the combustion gas, waste heat or solar heat may be used as a heat source. Refrigerant gas of high temperature and high pressure is produced in the generator 1 by being separated from the absorber which is a solution as the generator 1 is heated and flows through line 10, a solid line passage in the first change-over valve 2 which is a four-way valve and line 11 into the outdoor heat exchanger 3. In the outdoor heat exchanger 3 functioning as a condenser, the refrigerant gas undergoes heat exchange with outdoor air forcedly introduced thereinto by the blower 62, to be cooled by dissipating heat and changed into a liquid state. The liquid refrigerant of high pressure flows through line 12, a solid line passage in the second change-over valve 4 which is a four-way valve, line 13 and the first valve 6 which is a check valve into the first expansion valve 5 which is pressure reducing means. When the liquid refrigerant flows from the second change-over valve 4 to line 13, some of it flows in the direction of line 41. However, since the eighth valve 39 which is a check valve preventing inflow from line 41 to line 40 is mounted in line 41, the liquid refrigerant merely fills the line 41. The refrigerant gas of low temperature and low pressure produced at the first expansion valve 5 by pressure reduction upon expansion flows through lines 14 and 15 into the first indoor heat exchanger 7 where air is forcedly supplied by the blower 64, so that the refrigerant gas exchanges heat with the indoor air to enable the first indoor heat exchanger 7 to function as an evaporator to cool the air in the space. Meanwhile the refrigerant of low temperature and low pressure also enters line 34. However, since the second expansion valve 32 which is pressure reducing means is maintained in communication with the outlet side of the first indoor heat exchanger 7 through line 35, first change-over valve 2, line 33 and line 16, there is no pressure differential between the front and rear of the second expansion valve 32 and no refrigerant gas of low pressure and low temperature is allowed to flow therethrough. The refrigerant gas released from the first indoor heat exchanger 7 flows through lines 16 and 17, second valve 8 which is an on-off valve and line 18 into the second indoor heat exchanger 9 where heat exchange takes place by evaporation between the refrigerant gas and the indoor air forcedly circulated by the blower 64, to cool the indoor air and cool the space. The refrigerant gas flowing through the second valve 8 finds its way into line 40 too. However, since the liquid refrigerant of high pressure fills line 41 connected to line 40 via the eighth valve 39 which is a check valve, the eighth valve 39 is kept from being opened by the refrigerant gas of low pressure in line 40 and merely a portion of the low pressure refrigerant gas stays in line 40. The refrigerant gas that has performed an evaporation action in the two or first and second indoor heat exchangers 7 and 9 and cooled the indoor air flows through line 20 and reaches the point of confluence 19 with a diluted solution.

Meanwhile a diluted solution of low refrigerant concentration from which the refrigerant gas has been separated in the generator 1 flows through line 22 to the pressure reducing valve 21 where it has its pressure reduced and flows through line 23 toward the point of confluence 19 from which it flows through line 26, third valve 24 which is a check valve and line 27 into the absorber while being mixed with the refrigerant gas. At the absorber 25, the refrigerant and diluted solution mix with each other while being cooled by the outdoor air supplied by the blower 62, so that the refrigerant is absorbed by the diluted solution which is an absorbing agent and the diluted solution changes into a concentrated solution containing the refrigerant. At the absorber 25, heat of absorption is generated and dissipated. The concentrated solution is passed from the absorber 25 by the solution pump 28 through line 29 and second change-over valve 4 whch is a four-way valve and line 30, to be drawn by suction into the solution pump 28 where it has its pressure raised and transferred to the generator 1. At the generator 1, the concentrated solution generates refrigerant gas again so as to allow the aforesaid series of operations to be repeated to carry out space cooling.

In performing a heating operation, the operation mode change-over switch 48 is changed over to the heating operation contact 50 having connected thereto the defrosting operation switch 52 for performing a defrosting operation which has its thermostat 59 selectively connected to the heating contact 55 or defrosting contact 56 by the timer 53 and sensor. When the thermostat 59 is connected to the heating contact 55, the auxiliary relay 57 is energized and its positive contact 57*a* closes, and the electromagnetic contact 61 of the outdoor heat exchanger blower 62 and the electromagnetic contact 63 of the indoor heat exchanger blower 64 are energized through the electromagnetic contact 50 of the solution pump 28 and the reverse contact 58*b* of the auxiliary relay 58 that is not energized, so that the solution pump 28, outdoor heat exchanger blower 62 and indoor heat exchanger blower 64 start operating. Energization of the auxiliary relay 65 controls the heating source of the generator 1 as is the case with the cooling operation. The auxiliary relays 51 and 58 not being energized, the contacts 51*a* and 58*a* remain open and the electromagnetic coils 68 and 66 of the first change-over valve 2 and second change-over valve 4 which are four-way valves are no energized. Thus the passages of the first and second change-over valves 2 and 4 are connected to lines through broken line passages. The electromagnetic oil 67 of the second valve 8 which is an on-off valve is not opened either, so that the second valve 8 remains closed. The electromagnetic coil 69 of the fifth valve 36 which is an on-off valve is energized and the valve is opened because the reverse contact 51*b* is closed.

Thus the refrigerant gas of high temperature and high pressure produced in the generator 1 flows through line 10, a broken line passage of first change-over switch 2 and lines 33 and 16 into the first indoor heat exchanger 7 which functions as a condenser and causes heat to be released by heat exchange taking place between the refrigerant gas and the indoor air forcedly blown by the blower 64, to heat the space in a heating operation. The refrigerant gas flows into the first indoor heat exchanger 2 through line 16 but it also flows into line 17. However, since the second valve 8 which is an on-off valve is closed, the refrigerant does not flow. The liquid refrigerant of high pressure produced by condensation at the first indoor heat exchanger 7 flows through lines 15 and 34 and has its pressure reduced by the second expansion valve 32 which is pressure reducing means into a refrigerant gas of low pressure and low temperature which flows through line 35, a broken line passage of first change-over valve 2 which is a four-way valve and line 11 into the outdoor heat exchanger 3. The outdoor heat exchanger 3 functions as an evaporator, so that heat exchange takes place between the refrigerant gas and the outdoor air forcedly blown by the blower 62 and the gas absorbs heat. Meanwhile the first valve 6 which is a check valve keeps the refrigerant from flowing into line 14. The refrigerant released from the outdoor heat exchanger 3 flows through line 12, a broken line passage of second change-over valve 4 which is a four-way valve and line 29 into the absorber 25 which performs an absorbing action in a cooling mode but functions, in a heating mode, as an evaporator allowing the refrigerant alone to flow thereinto to exchange heat with the outdoor air. The refrigerant gas released from the absorber 25 flows through lines 27 and 37, fifth valve 36 which is an on-off valve and line 38 to the point of confluence 19 with a diluted solution. The refrigerant gas in line 27 flows into line 44 too, but does not flow therethrough because there is no pressure differential at the front and rear of the third expansion valve 42 which is pressure reducing means. The third valve 24 which is a check valve functions to prevent flow from line 27.

On the other hand, the diluted solution separated from the refrigerant gas in the generator 1 flows through the pressure reducing valve 21 by pressure differential toward the point of confluence 19 and mixed with the refrigerant gas referred to hereinabove, as is the case with the cooling operation. The mixture of diluted solution and refrigerant gas flows through line 20 into the second indoor heat exchanger 9 which functions as an absorber to perform an absorbing action. The heat of absorption generated is released into the indoor air blown forcedly by the blower 64 to heat the space. In this way, one of the two indoor heat exchanger functions as a condenser and the other indoor heat exchanger functions as an absorber and the heat of condensation and the heat of absorption are both used as heating heat sources. The outdoor heat exchanger 3 and absorber 25 function as evaporators to increase the heat transfer area of the evaporator, thereby improving the coefficient of performance. The concentrated solution released from the second indoor heat exchanger 9 is caused by the solution pump 28 to flow through lines 18 and 40, eight valve 39 which is a check valve, second change-over valve 4 and line 30 into the solution pump 28 which raises the pressure of the solution and returns same to the generator 1 where refrigerant gas is generated again, so that the aforesaid operations can be carried out continuously to effect space heating. The concentrated solution that has performed absorption flows through the eighth valve 39 that is a check valve and line 41 into line 13. However, since the first valve 6 which is a check valve blocks the passage of solution by high pressure gas, to keep the concentrated solution from flowing to the high pressure refrigerant gas side.

Continuation of heating operation will cause frost formation to take place on the heat exchange surfaces of the outdoor heat exchanger 3 functioning as an evaporator and the absorber 25, thereby interfering with evaporation. This makes it necessary to perform defrosting at a suitable time. A command for performing defrosting is given by the temperature sensor while the timer 53 of the defrosting operation switch 52 is being actuated, to bring the thermostat 59 into engagement with the defrosting contact 56. This deenergizes the auxiliary relay 57 and energizes the auxiliary relay 58, to open the positive contact 57a and close the positive contact 58a. This permits the solution pump 28 and indoor heat exchanger blower 64 to continue operation. However, with the reverse contact 58b being open, the outdoor heat exchanger blower 62 is rendered inoperative. Also the electromagnetic coil 68 is energized and the first change-over valve 2 which is a four-way valve has its passages switched because the positive contact 58a is closed, so that the passage of the refrigerant is switches to a solid line passage as is the case with the cooling operation. The second change-over valve 4 allows the refrigerant to flow through the same passage as in the heating mode. The electromagnetic coil 69 of the fifth valve 36 is de-energized to close the valve 36, because the positive contact 57a is open. The second valve 8 is closed as is the case witht the heating mode. This allows the refrigerant gas of high temperature and high pressure to flow through line 10, first change-over valve 2 which is a four-way valve and line 11 into the outdoor heat exchanger 3. With the blower 62 being inoperative, the frost on the surface of the outdoor heat exchanger 3 is separated from the surface efficiently by the high temperature refrigerant flowing through the heat exchanger 3. The high temperature refrigerant gas flows through line 12, second change-over valve 4 which is a four-way valve and line 29 into the absorber 25 functioning as an evaporator to melt the frost on the surface, to thereby effect defrosting. In this case, the blower 62 of the absorber 25 is rendered inoperative.

Defrosting of the outdoor heat exchanger 3 and absorber 25 functioning as evaporators is simultaneously carried out by the high temperature refrigerant gas. Upon completion of the defrosting, the refrigerant gas is condensed into a liquid refrigerant which, after having its pressure reduced by the third expansion valve 42 which is pressure reducing means, flow through lines 43 and 26 to the point of confluence 19 while not being evaporated yet. The diluted solution separated at the generator 1 which is at high temperature flows through line 20 while being mixed with the refrigerant not evaporated yet, and the mixture has its temperature raised by the heat of mixing and flows into the second indoor heat exchanger 9, to perform absorption while releasing heat into the indoor air forcedly blown by the blower 64. Space heating can be effected by the heat released into the indoor air, so that it is possible to carry out heating by the second indoor heat exchanger 9 while carrying out defrosting by the outdoor heat exchanger 3 and absorber 25 functioning as evaporators. Meanwhile no refrigerant flows to the first indoor heat exchanger 7 but the high temperature and high pressure refrigerant for heating operation remains therein, and its heat is released into the indoor air by operation of the blower 64 to be utilized as a heating heat source.

The concentrated solution that has performed absorption at the second heat exchanger 9 flows through line 40, eight valve 39 which is a check valve, lines 41 and 13, a broken line passage of second change-over valve 4 which is a four-way valve and line 30 to be drawn by suction into the solution pump 28, to have its pressure raised thereby and returned to the generator 1. The concentrated solution returned to the generator 1 generates refrigerant gas again, so that the aforesaid series of operation are carried out continuously to effect defrosting of the evaporators while performing space heating. A portion of the concentrated solution flowing through eighth valve 39 which is a check valve and lines 41 and 13 toward the second change-over valve 4 which is a four-way valve flows toward the first expansion valve 5 connected to line 13. However, since the first indoor heat exchanger 7 side is full of high temperature and high pressure refrigerant gas, the concentrated solution is kept from flowing through the first valve 6 that is a check valve.

After the system has been switched to a defrosting mode as aforesaid, the second indoor heat exchanger 9 is allowed to function as an absorber while keeping the indoor blowers functioning in the same manner as in the heating mode. By this feature, the heat of absorption can be utilized as a heating heat source and at the same time the heat of the high temperature refrigerant in the closed piping circuit including the first indoor heat exchanger 7 can be effectively utilized as a heating heat source.

Figure 3:
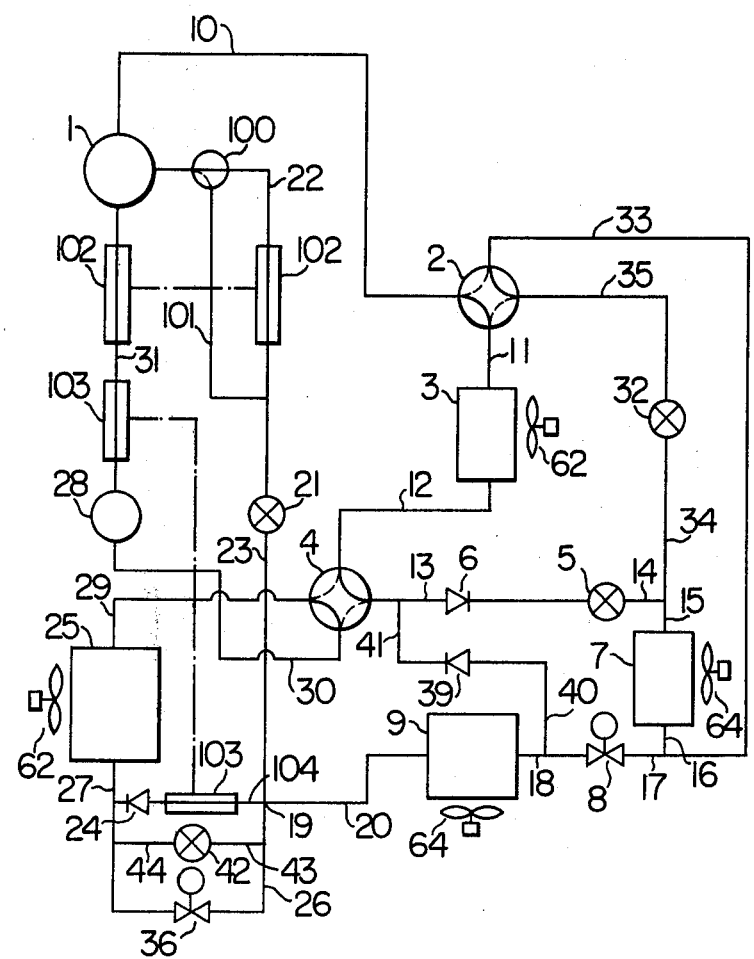
FIG. 3 is a systematic view of the refrigeration cycle of the absorption type cooling and heating system comprising another embodiment of the invention.

FIG. 3 shows another embodiment of improved constructional form in which the concentrated solution returned to the generator is further heated before being utilized again, to thereby increase operation efficiency. In the figure, parts having substantially the same functions as the parts shown in the basic cycle diagram shown in FIG. 1 will be designated by like reference characters and their description will be omitted.

A three-way change-over valve 100 is mounted in line 22 through which a diluted solution flows from the generator 1 to the pressure reducing valve 21, and a line 101 connects the three-way change-over valve 100 to a point in line 22 anterior to valve 21. A heat exchanger 102 is mounted between the lines 21 and 31 to allow the diluted solution and concentrated solution flowing through the line 22 and line 31 through which the concentrated solution flows respectively to exchange heat with each other. By this structural arrangement, the heat of the high temperature diluted solution can be given to the concentrated solution to raise the temperature of the concentrated solution, thereby enabling economizing to be effected on the amount of heat used for heating in the generator 1. The provision of the three-way change-over valve 100 enables the direction of flow of the diluted solution to be suitably selected, to allow same to flow without being subjected to heat exchange with the concentrated solution.

A heat exchanger 103 is intended to effectively utilize the heat generated as the refrigerant and diluted solution are mixed to heat the concentrated solution, to increase efficiency in a cooling mode. The heat exchanger 103 is located between line 31 through which the concentrated solution flows and line 104 connecting the point of confluence 109 of the diluted solution and refrigerant to the second valve 24 which is a check valve, to enable heat exchange to take place between the concentrated and diluted solutions.

By the aforesaid structural arrangement, the concentrated solution returned to the generator 1 has its temperature increased still higher, so that the heat required to carry out heating at the generator 1 can be saved and the object of energy conservation can be accomplished.

Figure 4:
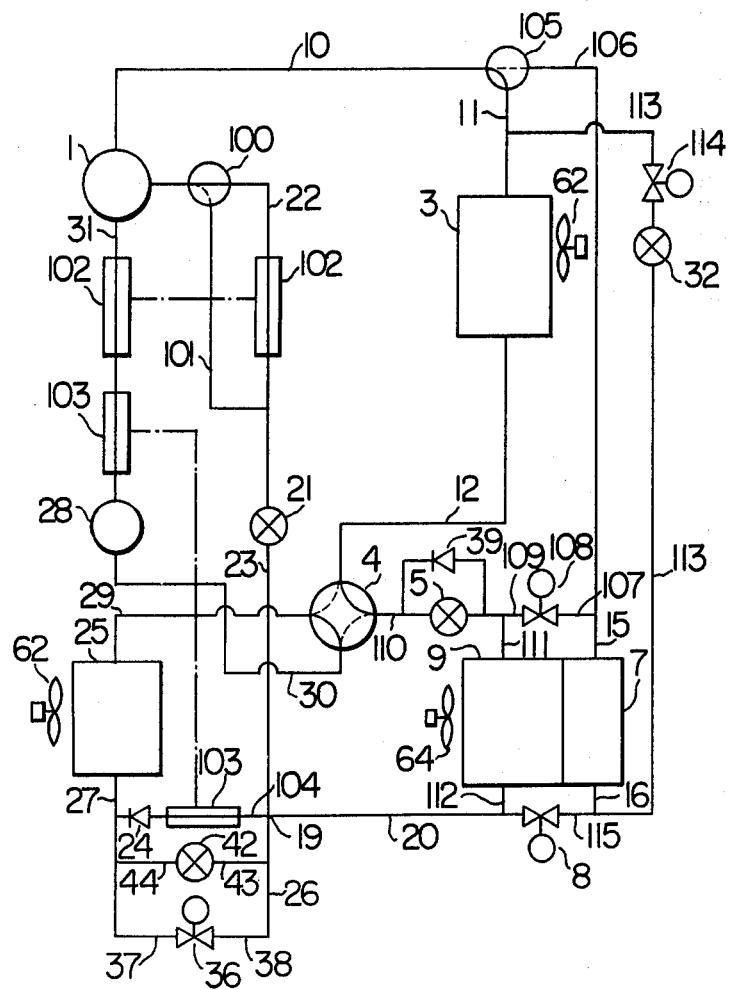
FIG. 4 is a systematic view of the refrigeration cycle of the absorption type cooling and heating system comprising still another embodiment of the invention.

FIG. 4 shows still another embodiment, in which some alterations are made in the circuit shown in FIG 1. One of the distinctions is that the two indoor heat exchangers 7 and 9 are connected in parallel with each other in a cooling mode. Another distinction is that the first change-over valve is a three-way valve 105 connected at its inlet end to line 10 and at its one outlet end to line 11 and at its another outlet end to line 15 through a line 106. Connected to line 15 is a line 107 that has connected in series therewith a first valve 108 which is an on-off valve, a line 109, first expansion valve 5 which is pressure reducing means and a line 110, before being connected to the second change-over valve 4 which is a four-way valve. The eighth valve 39 which is a check valve is connected in parallel with the first expansion valve 5. The second indoor heat exchanger 9 is connected to line 109 via a line 111 and to line 20 via a line 112. Line 11 has a line 113 connected thereto at one end and the other end of line 113 is connected in series with a fourth valve 114 which is an on-off valve and the second expansion valve 32 which is pressure reducing means, before being connected to the second valve 8 which is an on-of valve through line 16.

With the embodiment shown in FIG. 4 being constructed as aforesaid, the fourth valve 114 which is an on-off valve is closed in a cooling mode to allow a refrigerant gas to flow through line 10, a solid line passage of first change-over 105 which is a three-way valve and line 11 into the outdoor heat exchanger 3. The liquid refrigerant produced by condensation at the outdoor heat exchanger 3 is divided into two streams: one stream flows through line 12, a solid line passage of second change-over valve 4 which is a four-way valve, line 110, first expansion valve 5 which is pressure reducing means, line 109 and line 111 into the second indoor heat exchanger 9, and the other stream flows through first valve 108 which is an on-off valve and lines 107 and 15 into the first indoor heat exchanger 7. Thus two streams of low temperature and low pressure refrigerant having the pressure reduced flow in parallel into the two indoor heat exchangers 9 and 7 to perform evaporation. The refrigerant from the first indoor heat exchanger 7 flows through lines 16 and 115, second valve 8 which is an on-off valve and line 20 and joins the refrigerant from the second indoor heat exchanger 9 flowing through lines 112 and 20, to flow toward the point of confluence 19 with a diluted solution. The refrigerant released from the first valve 108 which is an on-off valve flows into line 106 too. However, since the broken line passage of the first change-over valve 105 which is a three-way valve is blocked, the refrigerant is not allowed to flow therethrough. The refrigerant flowing from the first indoor heat exchanger 7 into line 16 flows into line 103 too. However, the refrigerant is kept from flowing therethrough by the fourth valve 114 which is closed. The diluted solution flows through lines 22 and 23 to the point of confluence 19. While flowing therethrough, the diluted solution heats the concentrated solution through the heat exchanger 102. The mixture flowing from line 20 to the point of confluence 19 flows through line 104, third valve 24 which is a check valve and line 27 into the absorber 25 to effect absorption. With the fifth valve 36 which is an on-off valve being closed, no refrigerant flows through lines 38 and 37. Since no pressure differential is produced at the front and rear of the third expansion valve 42 which is pressure reducing means, no refrigerant flows to lines 43 and 44. Thus all the refrigerant flows through line 104 and the heat of the mixture solution flowing through line 104 is utilized for heating through the heat exchanger 103 the concentrated solution that has completed its absorbing operation. The concentrated solution released from the absorber 25 flows through line 29, second change-over velve 4 which 4 is a four-way valve and line 30 to the solution pump 28 which raises the pressure of the concentrated solution which is then heated by the heat exchangers 102 and 103, before being returned to the generator 1.

In a heating mode, refrigerant gas flows through line 10, first change-over valve 105 which is a three-way valve and lines 106 and 15 into the first indoor heat exchanger 7 functioning as a condenser, to provide a heating heat source. The refrigerant gas is then passed through lines 16 and 113 into the second expansion valve 32 which is pressure reducing means, to have its pressure reduced by expansion into a liquid refrigerant. The liquid refrigerant flows through fourth valve 114 which is an on-off valve and lines 13 and 111 into the outdoor heat exchanger 3 functioning as an evaporator, so that evaporation is carried out. The refrigerant flows into line 115 but kept from flowing therethrough because the second valve 8 which is an on-off valve is closed. The liquid refrigerant produced by condensation flows through line 12, second change-over valve 4 which is a four-way valve, line 29, absorber 25 functioning as an evaporator, lines 27 and 37, fifth valve 36 which is an on-off valve and lines 38 and 26 to the point of confluence 19 at which the liquid refrigerant mixes with a diluted solution flowing through lines 22 and 23 which is a diluted solution passage. Then the mixture solution flows through lines 20 and 112 into the second indoor heat exchanger 9 functioning as an evaporator, so that the heat of absorption can be utilized as a heating heat source. The concentrated silution that has completed absorption flows through line 111, eighth valve 39 which is a check valve, line 110, second changeover valve 4 which is a four-way valve and line 30, to be drawn by suction into the solution pump 28. At the solution pump 28, the solution has its pressure raised, and is heated through heat exchange by the heat exchanger 102 while flowing through line 31, before reaching the generator 1. In this way, the heat of the high temperature refrigerant and the heat of absorption obtained by absorption both can be utilized as heating heat sources.

In a defrosting mode, refrigerant gas flows through line 10, a solid line passage of first change-over valve 105 which is a three-way valve and line 11 into the outdoor heat exchanger 3, to carry out defrosting of the outdoor heat exchanger 3 functioning as an evaporator in the heating mode. With the fourth valve 114 which is an on-off valve being closed, no refrigerant flows to a path connected to line 113. Then the refrigerant flows from the outdoor heat exchanger 3 through line 12, second change-over velve 4 which is a four-way valve and line 29 into the absorber 25 functioning as an evaporator to effect defrosting. Then the refrigerant flows through lines 27 and 44, third expansion valve 42 which is pressure reducing means where it has its pressure reduced, and lines 43 and 26 to the point of confluence 19 with a diluted solution. At the point of confluence 19, it mixes with a high temperature diluted solution flowing through lines 22 and 23 and the mixture flows through lines 20 and 112 into the second indoor heat exchanger 9 functioning as an absorber, where it releases the heat of absorption which serves as a heating heat source to carry out space heating.

Thus it will be appreciated that defrosting can be carried out while heating is being carried out, so that the system does not lose its heating capabilities even while defrosting is being carried out.

Figure 5:
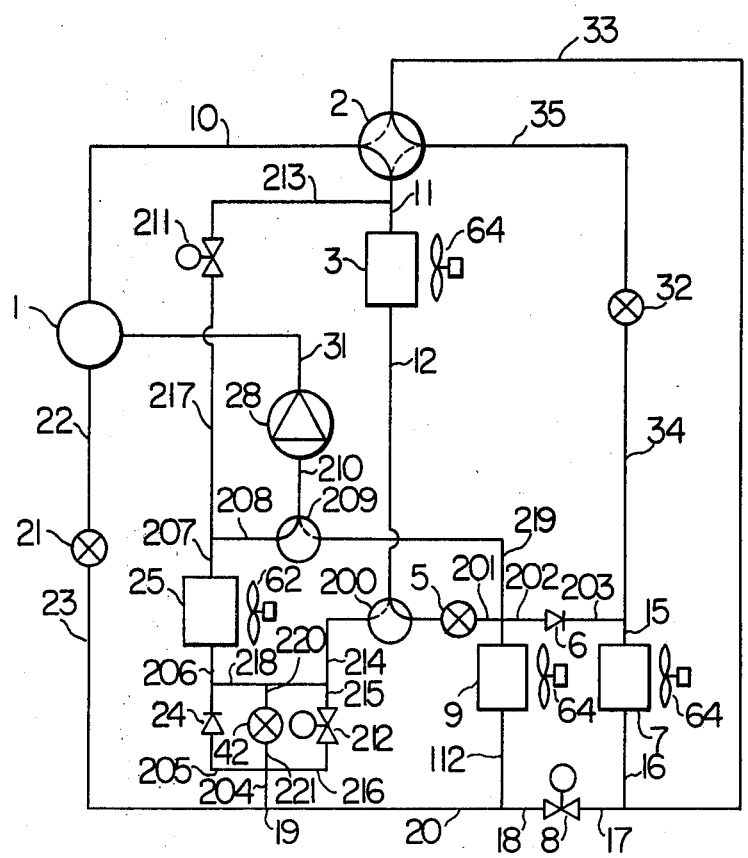
FIG. 5 is a systematic view of the refrigeration cycle of the absorption type cooling and heating system comprising a further embodiment of the invention.

FIG. 5 shows a further embodiment which is fundamentally distinct from the embodiments shown in FIGS. 1 and 4 in that the outdoor heat exchanger functioning as an evaporator in a heating mode is connected in parallel with the absorber in a circuit.

In a cooling mode, refrigerant gas flows through line 10, a solid line passage of first change-over valve 2 which is a four-way valve and line 11 into the outdoor heat exchanger 3 functioning as a condenser where it is changed into a liquid state by condensation. The liquid refrigerant flows through line 12, a second change-over valve 200 which is a three-way valve, first expansion valve 5 functioning as pressure reducing means where it has its pressure reduced by expansion, and lines 201 and 111 into the second indoor heat exchanger 9 functioning as an evaporator. Also it flows through a line 202, first valve 6 which is a check valve and lines 203 and 15 into the first indoor heat exchanger 7 functioning as an evaporator, so as to cool the indoor air and effect space cooling. The refrigerant further flows through lines 112 and 20, lines 16 and 17, second valve 8 which is an on-off valve and line 18, so that the refrigerant released from the indoor heat exchangers 7 and 9 flows through line 20 to the point of confluence 19 with a diluted solution. At the point of confluence 19, the refrigerant mixes with a diluted solution flowing from the generator 1 through lines 22 and 23, and the mixture flows through lines 204 and 205, third valve 24 which is a check valve and a line 206 into the absorber 25, to carry out absorption. Upon completion of the absorption, the concentrated solution further flows through lines 207 and 208, a third change-over valve 209 which is a three-way valve and a line 210, to be drawn by suction into the solution pump 28 to have its pressure raised thereby. The pressurized solution is returned through line 31 to the generator 1. To form the cooling circuit described hereinabove, a seventh valve 211 and a sixth valve 212 which are on-off valves are closed and the second valve 8 which is also an on-off valve is opened, as they are controlled to attain the end.

In a heating mode, refrigerant gas flows through line 10, a broken line passage of first change-over valve 2 which is a four-way valve and lines 33 and 16 into the first indoor heat exchanger 7 functioning as a condenser, to heat the indoor air and effect space heating. The liquid refrigerant produced by condensation flows through lines 15 and 34, second expansion valve 32 which is pressure reducing means where it has its pressure reduced to be changed into a refrigerant gas of low temperature and low pressure, line 35, and a broken line passage of first change-over valve 2 which is a four-way valve into lines 11 and 213. The refrigerant flowing into line 11 flows through the outdoor heat exchanger 3 functioning as an evaporator, line 12, second change-over valve 200 which is a three-way valve, lines 24 and 215, sixth valve 212 which is an on-off valve and lines 216 and 204, to the point of confluence 19 with a diluted solution. Meanwhile the refrigerant flowing into line 213 flows through seventh valve 211 which is an on-off valve and lines 217 and 207 into the absorber 25 functioning as an evaporator, to perform evaporation. From the absorber 25, the refrigerant flows through lines 206, 218 and 215, sixth valve 212 which is an on-off valve and lines 216 and 204 to the point of confluence 19. The refrigerant flowing in parallel through the outdoor heat exchanger 3 and absorber 25 functioning as evaporators in this way mixes at the point of confluence 19 with a diluted solution flowing from the generator 1 through lines 22 and 23, and the mixture flows through lines 20 and 112 into the second indoor heat exchanger 9 functioning as an absorber. Thus the heat of absorption generated by the absorbing operation is released into the indoor air to serve as a heating heat source. According to the invention, the heat of the refrigerant of high temperature and the heat of absorption can both be utilized as heating heat sources in a heating mode. Upon completion of absorption, the concentrated solution flows through lines 111 and 219, third change-over valve 209 which is a three-way valve and line 210, to be drawn by suction into the solution pump 28 to have its pressure raised. The pressurized solution is returned through line 31 to the generator 1. To form the aforesaid heating circuit, the second valve 8 which us an on-off valve is closed and the seventh and sixth valves 217 and 216 which are also on-off valves are opened, as they are controlled to attain the end.

In a defrosting mode, a refrigerant gas of high temperature flows through line 10, first change-over valve 2 which is a four-way valve and lines 11 and 213, to flow thereafter in two streams in parallel. The refrigerant flowing into line 11 flows through the outdoor heat exchanger 3 functioning as an evaporator in a heating mode to carry out defrosting therein. Thereafter the refrigerant flows through line 12, second change-over valve 200 which is a three-way valve, lines 214, 218 and 220, a third expansion valve 42 which is pressure reducing means where it has its pressure reduced by expansion and lines 221 and 204 to the point of confluence 19 with a diluted solution. The refrigerant flowing into line 213 flows through seventh valve 211 and lines 217 and 207 into the absorber 25 functioning as an evaporator in a heating mode, to carry out defrosting therein. Thereafter the refrigerant flows through lines 206, 123 and 220, third expansion valve 42 which is pressure reducing means and lines 221 and 204 to the point of confluence 19.

At the point of confluence 19, the refrigerant mixes with a diluted solution of high temperature from the generator 1 through lines 22 and 23, and the mixture flows through lines 20 and 112 into the second indoor heat exchanger 9 functioning as an absorber, to perform absorption, so that the heat of absorption is released into the indoor heat to heat same to perform a heating operation by the heat of absorption. The first indoor heat exchanger 7 constitutes a closed circuit filled with a refrigerant of high temperature and high pressure, and the heat generated in the heating mode is utilized as a heating heat source in the defrosting mode.

To form the aforesaid defrosting circuit, the sixth valve 212 and second valve 8 which are on-off valves are closed and the seventh valve 211 which is also an on-off valve is opened, as they are controlled to attain the end.

Although not shown in FIG. 5, the circuit shown therein may include a heat exchanger for utilizing the heat of mixing produced when a diluted solution of high temperature is mixed with refrigerant in a cooling mode to increase the temperature of the concentrated solution returned to the generator 1 to increase operation efficiency, as is the case with the circuits shown in FIGS. 3 and 4.

What is claimed is:

1. An absorption type cooling and heating system comprising:
   a path connecting a generator through a first change-over valve, an outdoor heat exchanger, a second change-over valve, a first valve, a first expansion valve, a first indoor heat exchanger, a second valve and a second indoor heat exchanger to a point of confluence with a diluted solution, so that the two indoor heat exchangers can be connected in series with each other;
   a path connecting said generator to said point of confluence through a pressure reducing valve;
   a path connecting said point of confluence to an absorber through a third valve;
   a path connecting said absorber to said generator through said second change-over valve and a solution pump;
   a path connecting said first change-over valve to a second expansion valve through said first indoor heat exchanger;
   a path connecting said second expansion valve to said outdoor heat exchanger through said first change-over valve;
   a path connecting said outdoor heat exchanger to said point of confluence through said second change-over valve, said absorber and a fifth valve;
   a path connecting said point of confluence to said second change-over valve through said second indoor heat exchanger and an eighth valve; and
   a path connecting a third expansion valve in series with said third valve.

2. An absorption type cooling and heating system as claimed in claim 1, comprising a three-way change-over valve mounted midway in a path of a diluted solution connecting said generator to a pressure reducing valve, a heat exchanger mounted between one path branching at said three-way valve for a diluted solution to flow therethrough and a path connecting said generator to said solution pump for a concentrated solution to flow therethrough, to allow heat exchange to take place between the diluted solution and the concentrated solution, and a heat exchanger mounted between a path connecting said third valve to said point of confluence for a concentrated solution to flow therethrough and the and the path connecting said generator to said solution pump for the concentrated solution to flow therethrough, to allow heat exchange to take place between the two concentrated solutions.

3. An absorption type cooling and heating system comprising:
   a path connecting a generator through a first change-over valve, an outdoor heat exchanger, a second change-over valve, a first expansion valve, a first valve and a first heat exchanger to a second valve, said path having a second indoor heat exchanger connected in parallel with said first indoor heat exchanger before reaching a point of confluence with a diluted solution;
   a path connecting said generator to said point of confluence through a pressure reducing valve;
   a path connecting said point of confluence to an absorber through a third valve;
   a path connecting said absorber to said generator through said second change-over valve and a solution pump;
   a path connecting said first change-over valve to a second expansion valve through said first indoor heat exchanger;
   a path connecting said second expansion valve to said outdoor heat exchanger through a fourth valve;
   a path connecting said outdoor heat exchanger to said point of confluence through said second change-over valve, said absorber and a fifth valve;
   a path connecting said point of confluence to said second change-over valve through said second indoor heat exchanger and an eighth valve; and
   a path connecting a third expansion valve in parallel with said third valve.

4. An absorption type cooling and heating system as claimed in claim 3, comprising a three-way change-over valve mounted midway in a path of a diluted solution connecting said generator to a pressure reducing valve, a heat exchanger mounted between one path branching at said three-way valve for a diluted solution to flow therethrough and a path connecting said generator to said solution pump for a concentrated solution to flow therethrough, to allow heat exchange to take place between the diluted solution and the concentrated solution, and a heat exchanger mounted between a path connecting said third valve to said point of confluence for a concentrated solution to flow therethrough and the path connecting said generator to said solution pump for the concentrated solution to flow therethrough, to allow heat exchange to take place between the two concentrated solutions.

5. An absorption type cooling and heating system comprising:
   a path connecting a generator through a first change-over valve, an outdoor heat exchanger, a second change-over valve, a first expansion valve, a first valve and a first indoor heat exchanger to a second valve, said path having a second indoor heat exchanger connected in parallel with said first indoor heat exchanger before reaching a point of confluence with a diluted solution;

a path connecting said generator to said point of confluence through a pressure reducing valve;

a path connecting said point of confluence to an absorber through a third valve;

a path connecting said absorber to said generator through a third change-over valve and a solution pump;

a path connecting said first change-over valve to a second expansion valve through said first indoor heat exchanger;

a path connecting said second expansion valve to said second change-over valve through said first change-over valve and said outdoor heat exchanger;

a path connecting said second change-over valve to said point of confluence through a sixth valve;

a path connected to said sixth valve having a seventh valve and said absorber connected in parallel with said outdoor heat exchanger;

a path connecting said point of confluence to said third change-over valve through said second indoor heat exchanger; and a path connecting a third expansion valve in parallel with said third valve.

6. An absorption type cooling and heating system as claimed in claim 5, comprising a three-way change-over valve mounted midway in a path of a diluted solution connecting said generator to a pressure reducing valve, a heat exchanger mounted between one path branching at said three-way valve for a diluted solution to flow therethrough and a path connecting said generator to said solution pump for a concentrated solution to flow therethrough, to allow heat exchange to take place between the diluted solution and the concentrated solution, and a heat exchanger mounted between a path connecting said third valve to said point of confluence for a concentrated solution to flow therethrough and the path connecting said generator to said solution pump for the concentrated solution to flow therethrough, to allow heat exchange to take place between the two concentrated solutions.

* * * * *